United States Patent
Murphy et al.

(10) Patent No.: US 10,061,112 B1
(45) Date of Patent: Aug. 28, 2018

(54) OPTICAL ACCESSORY PROJECTION SYSTEM

(71) Applicant: Opti-Logic Corporation, Tullahoma, TN (US)

(72) Inventors: Jonathan Murphy, Tullahoma, TN (US); James Farrer, Tullahoma, TN (US); Clark McCune, Tullahoma, TN (US); Rusty McCune, Tullahoma, TN (US); Brandon Roach, Tullahoma, TN (US)

(73) Assignee: Opti-Logic Corporation, Tullahoma, TN (US)

( * ) Notice: Subject to any disclaimer, the term of this patent is extended or adjusted under 35 U.S.C. 154(b) by 0 days.

(21) Appl. No.: 15/424,460

(22) Filed: Feb. 3, 2017

Related U.S. Application Data

(60) Provisional application No. 62/290,534, filed on Feb. 3, 2016.

(51) Int. Cl.
| | | |
|---|---|---|
| *G02B 23/10* | (2006.01) | |
| *G02B 27/00* | (2006.01) | |
| *G02B 27/12* | (2006.01) | |
| *G02B 27/01* | (2006.01) | |
| *G09G 3/00* | (2006.01) | |
| *G02B 7/04* | (2006.01) | |
| *F41G 1/38* | (2006.01) | |

(52) U.S. Cl.
CPC .............. *G02B 23/10* (2013.01); *F41G 1/38* (2013.01); *G02B 7/04* (2013.01); *G02B 27/0006* (2013.01); *G02B 27/0189* (2013.01); *G02B 27/126* (2013.01); *G09G 3/002* (2013.01); *G09G 2340/045* (2013.01)

(58) Field of Classification Search
CPC .... F41G 1/32–1/38; G02B 23/10; G02B 7/04; G02B 27/0006; G02B 27/126; G02B 27/0189; G09G 3/002; G09G 2340/045
See application file for complete search history.

(56) References Cited

U.S. PATENT DOCUMENTS

| | | | |
|---|---|---|---|
| 5,079,646 A | * | 1/1992 | Schwartz ................. F41G 1/38 359/819 |
| 5,386,308 A | | 1/1995 | Michel et al. |
| 5,638,202 A | | 6/1997 | Rofe |

(Continued)

FOREIGN PATENT DOCUMENTS

WO      2015044148 A1    4/2015

*Primary Examiner* — Stephen Johnson
*Assistant Examiner* — Joshua T Semick
(74) *Attorney, Agent, or Firm* — Patterson Intellectual Property Law, P.C.; Gary L. Montle

(57) ABSTRACT

An apparatus is provided which may be selectively used in a variety of different ways. In one example the apparatus may be attached to one or more preexisting optical accessories to allow a user to view external environmental information concurrently when looking through the ocular lens of an optical device. Advantageously, such an implementation may permit a user to effectively obtain environmental data without moving away from an optical device. In another example, an optical system may be used to selectively attach an external device to an optical device to transmit environmental data recorded by the external device in order to superimpose an image through an ocular lens to be displayed concurrently with a target scene.

9 Claims, 5 Drawing Sheets

(56) References Cited

U.S. PATENT DOCUMENTS

| | | | |
|---|---|---|---|
| 7,374,283 B2 | 5/2008 | Blum et al. | |
| 8,683,732 B2 * | 4/2014 | Joplin | F41G 11/003 42/124 |
| 8,842,981 B2 * | 9/2014 | Fujikake | G03B 17/566 396/432 |
| 9,121,671 B2 * | 9/2015 | Everett | F41G 1/30 |
| 9,335,124 B2 * | 5/2016 | Maryfield | F41G 1/30 |
| 9,389,425 B2 * | 7/2016 | Edwards | G02B 27/0189 |
| 9,466,120 B2 * | 10/2016 | Maryfield | G06T 7/20 |
| 9,702,661 B2 * | 7/2017 | Kremer | F41G 1/38 |
| 9,791,244 B2 * | 10/2017 | Maryfield | F41G 11/00 |
| 2009/0213282 A1 | 8/2009 | Burlingame et al. | |
| 2010/0026917 A1 | 2/2010 | Wen et al. | |
| 2011/0272580 A1 * | 11/2011 | Houde-Walter | F41G 1/35 250/338.3 |
| 2011/0310318 A1 | 12/2011 | Kawagoe | |
| 2012/0293733 A1 | 11/2012 | Li et al. | |
| 2013/0300960 A1 | 11/2013 | Wen et al. | |
| 2015/0097960 A1 * | 4/2015 | Jones | H04N 5/23229 348/158 |
| 2017/0227327 A1 * | 8/2017 | Thomas | F41G 1/473 |

\* cited by examiner

OPTICAL ACCESSORY PROJECTION SYSTEM

CROSS-REFERENCES TO RELATED APPLICATIONS

This application claims benefit of U.S. Provisional Patent Application No. 62/290,534, filed Feb. 3, 2016, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to optical accessories. More particularly, the present invention relates to an image reflection system that attaches to existing optical scopes and incorporates the functionality of integrating display information from an external environmental measuring device into the scope.

Optical accessories, such as magnifying scopes and laser rangefinders have been historically utilized to enable a user to view a magnified image of a target scene. The term "scope" as used herein may generally refer to a type of optical instrument mounted on a secondary device to aide in the effectiveness of viewing a target. It is common for users of such optical accessories to have a need for external information from the environment such as temperature, humidity, direction, distance, elevation, etc. In many instances where an external device reads information from the environment, the use must remove their eye from an optical accessory and use the measuring device. The user must then go back to the optical accessory at which point the opportunity to view an intended target may have been missed.

Therefore, what is needed is an optical system that may inject external environmental information into an optical device to be projected concurrently with a target scene.

It is further desirable that the projection system be adaptable for use with a plurality of scopes of varying size.

BRIEF SUMMARY OF THE INVENTION

This section provides a general summary of the disclosure. It is not a comprehensive disclosed of its full scope or all of its features.

In accordance with various embodiments described herein, an apparatus for injecting external information into an optical device is provided which may be selectively used in a variety of different ways. For example, the apparatus may be attached to one or more preexisting optical accessories to allow a user to view environmental information concurrently while focusing on a target scene.

In one embodiment, an apparatus for injecting external information in an optical device may be implemented comprising a housing configured to attach to a variety of optical devices, an internal display system to receive an input and transmit an image, at least one collimating lens configured to collimate the generated image to theoretical infinity, and a display reflection system configured to reflect the collimated image along an optical axis of an optical device.

An optical system is provided and may include an optical device operably mounted to a firearm, an apparatus for injecting external information into the optical device by a display reflection system, and an external device operably attached to the apparatus to transmit data indicative of environmental measurements.

These and other objects, advantages, and features of the disclosure will become more apparent from the following description of exemplary embodiments taken in conjunction with the accompanying drawings. The description and specific examples in this summary are intended for illustrative purposes only and are not intended to limit the scope of the present disclosure.

DETAILED DESCRIPTION OF THE INVENTION

Figure 1:
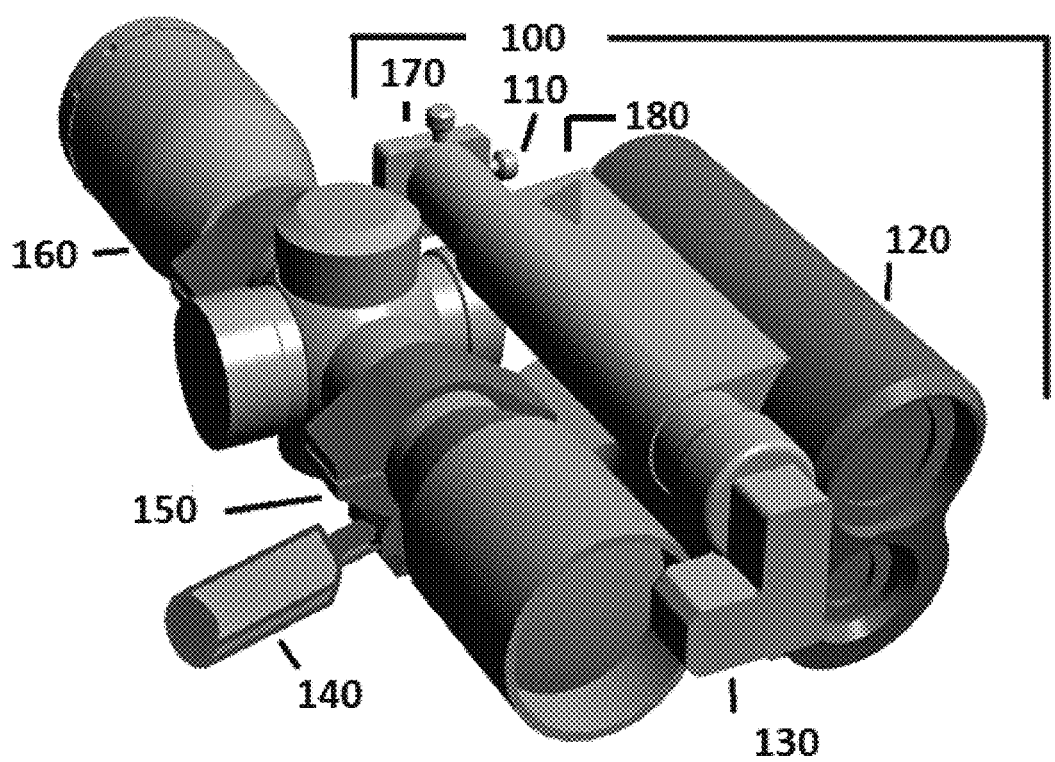
FIG. 1 is perspective front view of an embodiment of an apparatus for injecting external information into an optical device.
Figure 2:
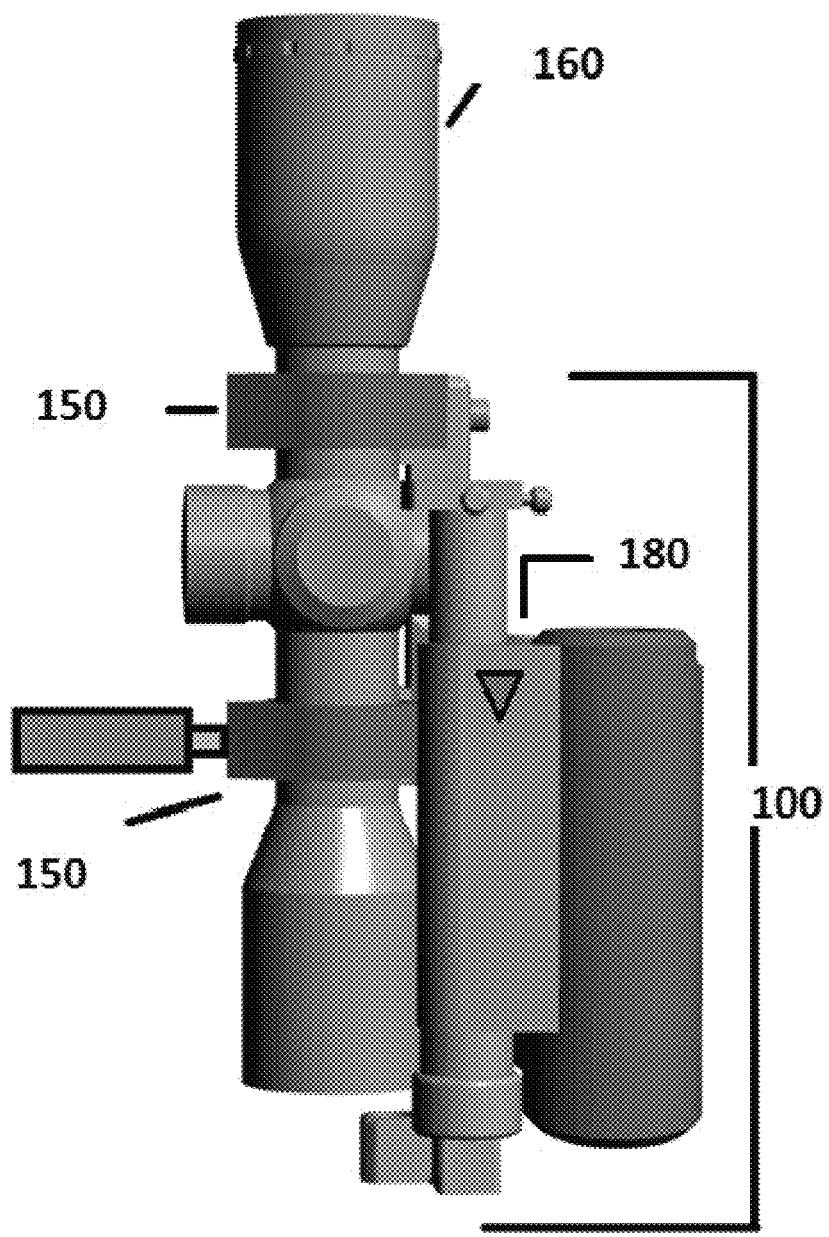
FIG. 2 is a perspective top view of an embodiment of an apparatus for injecting external information into an optical device.
Figure 3:
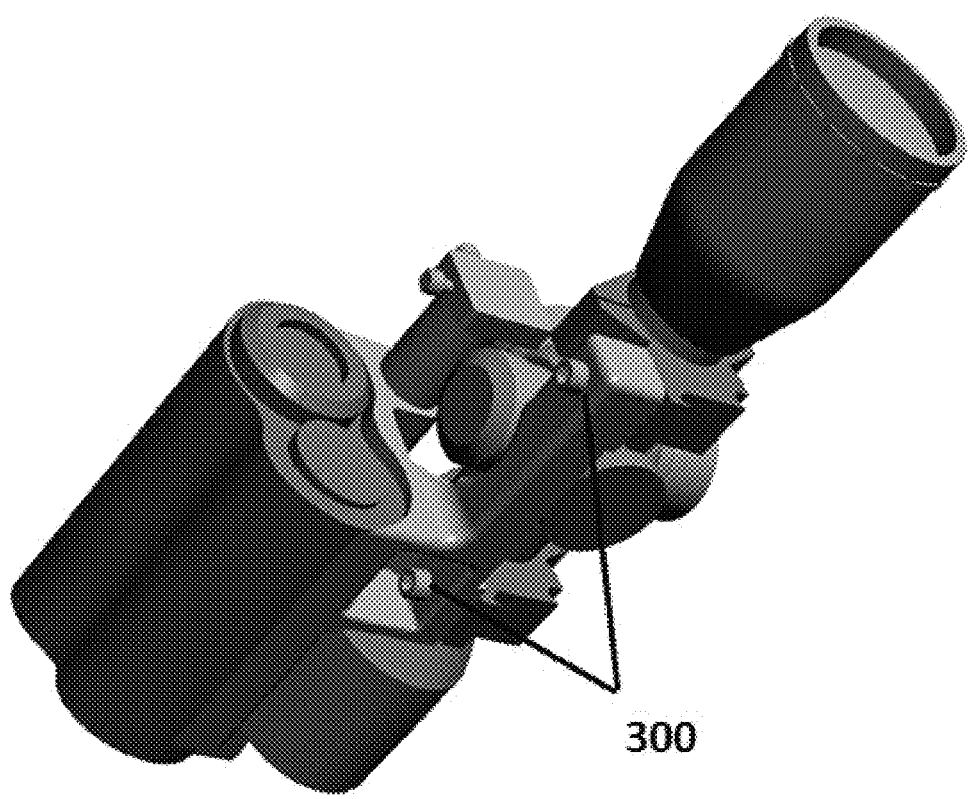
FIG. 3 is a perspective rear view of an embodiment of an apparatus for injecting external information into an optical device.

Referring generally to FIGS. 1-5, various exemplary embodiments of an invention may now be described in detail. Where the various figures may describe embodiments sharing various common elements and features with other embodiments, similar elements and features are given the same reference numerals and redundant description thereof may be omitted below.

As illustrated, reference number 170 refers to an apparatus for injecting external information into an optical device 160 including a housing 100. The housing 100 may be configured to attach to an external device 120 and an optical device 160 simultaneously. In an exemplary embodiment, the housing 100 may be attached to a preexisting optical device 160 that is mounted to a firearm. The preexisting optical device 160 may be a rifle scope, reflex scope, crossbow scope, or a type of similar optical device.

In certain embodiments, the housing 100 of an apparatus for injecting external information into an optical device 170 may include one or more water resilient materials. The housing 100 may be sealed such to prevent water from entering the inner body of the apparatus for injecting external information into an optical device 170. In some embodiments, the apparatus for injecting external information into an optical device 170 may be further configured to be submerged in water without hindering functionality. Additionally, certain embodiments of the apparatus for injecting external information into an optical device 170 may include a finish which is configured to match environmental settings (e.g. woodland camouflage, digital camouflage). In some embodiments the finish may be adapted to be non-reflective.

In certain embodiments, the housing 100 of an apparatus for injecting external information into an optical device 160 may include an adjustable rail assembly 110 which may increase or decrease the focused display size within an optical device 160. Additionally, the housing 100 may include one or more counterweights 140 that are removably attached to the housing 100. The counterweights 140 may offset the weight of the apparatus for injecting external information into an optical device 170 to provide a more balanced system when attached to a firearm.

The housing 100 may attach to an optical device 160 by connecting to one or more ring clamps 150 used to mount the optical device 160 to a firearm. In some embodiments the housing 100 may be connected using bolts or screws 300 connected to the ring clamps. In other embodiments the housing 100 may be connected using an adhesive in combination with set screws. Alternatively, the housing 100 may be attached an optical device 160 using an interlocking mechanical connector.

In some embodiments the housing 100 may include one or more user interface inputs 180 disposed along an outer surface of the system. These user interface inputs 180 may be used to receive a user input corresponding to a desired operating method. These interface inputs 180 may be a switch, button, joystick, knob, interactive voice recognition, or any other similar mechanism. Optionally the user interface inputs may be directly connected (e.g. wiring) and/or wirelessly connected (e.g. Bluetooth) to the control circuit.

In certain embodiments, the external device 120 may be attached to a rail assembly 110 by adjustable mounts. The rail assembly 110 may be a Picatinny, Weaver, or other standard firearm rail mounts. When operable, the external device 120 may record information of the surrounding environment and transmit an output signal indicative of the information recorded. The external device 120 may be operably connected to a control circuit 190 by direct connection and configured to communicate via I2C, SPI, CSI, UART, USB, or another standardized communication protocol. In an alternative embodiment, the external device 120 may be operably connected to a control circuit by wireless connection and configured to communicate via Bluetooth, WIFI, 802.11, or other standardized wireless communication protocol. The control circuit 190 may be configured to convert information received from the external device 120 into an output signal configured to be displayed by an internal display system 130.

In an exemplary embodiment, the external device 120 may be configured to automatically record environmental data to transmit to the control circuit. In certain embodiments the external device 120 may be configured to record environmental data to transmit to the control circuit based upon user selected inputs. The external device 120 may be configured to sync with the apparatus for injecting external information into an optical device 170. This synchronization may include transferring or recording environmental data to or from the external device 120. Additionally, the external device 120 may include one or more data sensors configured to record environmental data. In some embodiments, data recorded may be range, temperature, humidity, pressure, direction, tilt, or other ambient conditions. In other embodiments, the external device 120 may measure various ambient conditions concurrently. The external device 120 may be powered by a battery operatively connected to the control circuit.

Figure 4:
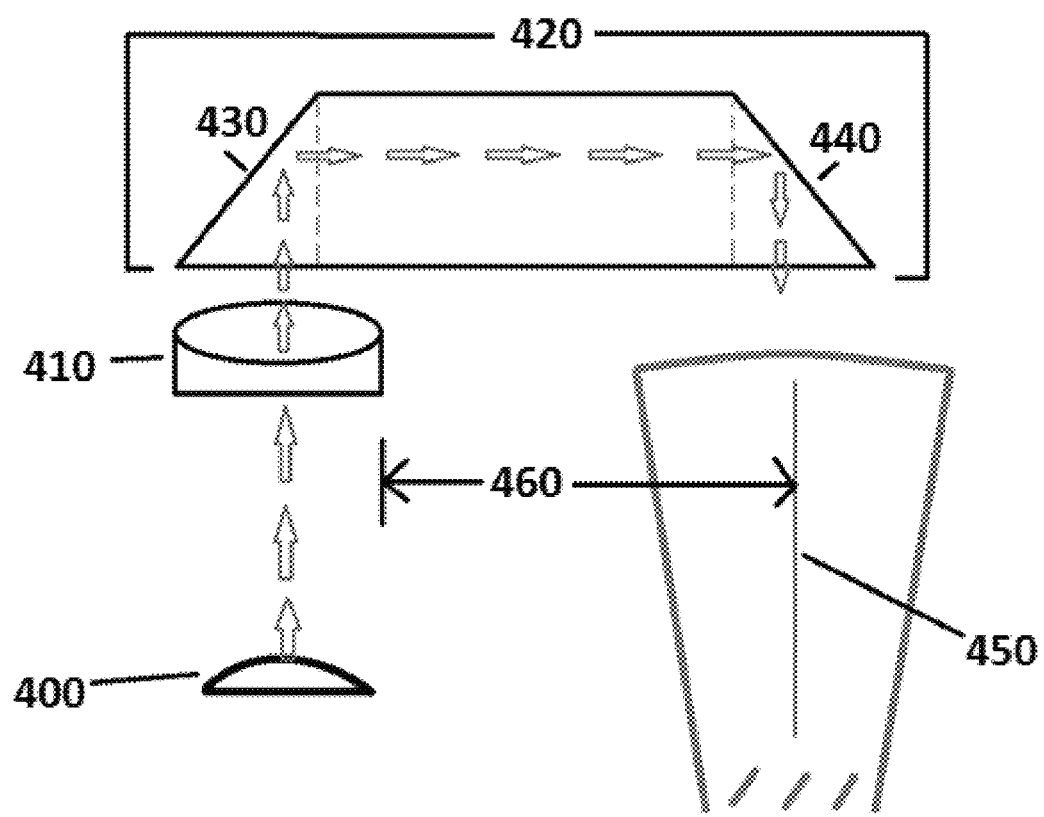
FIG. 4 is a plan view of an embodiment of an apparatus for injecting external information into an optical device.
Figure 5:
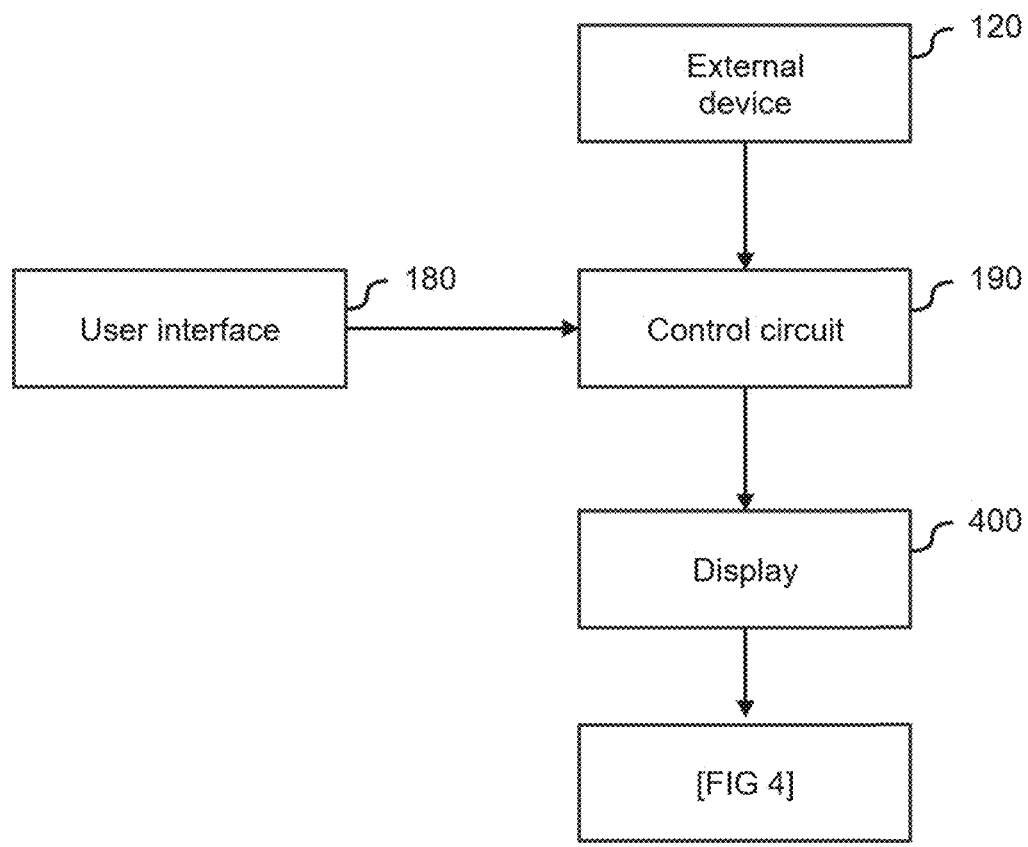
FIG. 5 is a block diagram representing internal elements of the embodiment of the apparatus of FIG. 1.

With particular reference to FIG. 4, an internal display 400 may transmit an optical light configured to be collimated through a collimating lens 410 along an optical path defined by the internal display 400. The optical light may be indicative of the control output corresponding to the external device 120 output. In an exemplary embodiment, after passing through the collimating lens 410, the optical light may be deflected by a mirrored edge 430 of a custom reflective lens 420. The custom reflective lens 420 may include a prism. In some embodiments, the optical light may then again be deflected by a beam splitter 440 at the opposite end of the custom prism 420. In certain embodiments, the beam splitter 440 may be positioned to superimpose the optical light in the target scene of an optical device 160 by reflecting the optical light through the center of the optical path 450 of the optical device 160. The distance separating the outside edge of the assembly 460 and the optical path of the optical device 160 may be selected according to the desired location of the directed image signal relative to the optical device's optical path 450. In other embodiments the beam splitter 440 may direct the optical light to the optical device 160 while allowing ambient light behind the beam splitter 440 to be transmitted to the optical device 160 to prevent the beam splitter 440 from obstructing the line of sight of the optical device 160.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. An apparatus for injecting external information into an optical device having a length and through which a target scene is viewable to a user, comprising:
    at least first and second clamps, having first and second halves adjustably secured to each other via bolts or set screws, and configured to wrap around and mount to the optical device at a respective at least first and second points along its length, wherein the first and second clamps are selectively attachable to a variety of optical devices;
    a housing coupled to a first side of the first and second clamps relative to the optical device, and at least one counter weight coupled to at least one of the first and second clamps on an opposing second side relative to the optical device;
    a control circuit disposed within the housing and configured to receive an input corresponding to measured environmental information, and to transmit a control output indicative of a received input;
    a display configured to communicate with the control circuit, and operable to project an image indicative of control outputs received from the control circuit;
    at least one collimating lens disposed within the housing, the at least one collimating lens transversely orientated respective to a first optical axis defined by an image projected from the display and parallel to an optical axis of the optical device, the at least one collimating lens positioned to collimate the projected image; and
    a prism disposed within the housing and comprising
        a first surface arranged along the first optical axis to receive the projected image after the collimating lens and including a mirrored edge configured to reflect the projected image along a second optical axis having a transverse orientation respective to the length of the optical device, and
        a second surface adapted to receive the reflected image from the first surface, the second surface including a beam splitter configured to superimpose the image in focus with the target scene of the optical device.

2. The apparatus of claim 1, wherein the housing is formed of a water resilient material.

3. The apparatus of claim 1, wherein the housing is coated with a non-reflective material.

4. The apparatus of claim 1, wherein the apparatus is configured to operate when submersed in water.

5. The apparatus of claim 1, further comprising an external environmental condition measuring device configured to transmit the input corresponding to the measured environmental information to the control circuit via a standardized communications protocol.

6. The apparatus of claim 5, wherein the environmental condition measuring device comprises one or more sensors configured to record environmental data comprising: range to target; temperature; humidity; air pressure; direction; and tilt.

7. The apparatus of claim 5, wherein the environmental condition measuring device is operably attachable to a first side of the housing opposite a second side of the housing that is connected to the optical device.

8. The apparatus of claim 7, wherein the environmental condition measuring device is attached to a rail assembly by adjustable mounts, further wherein the rail assembly is responsive to user input to vary a size of the displayed image as viewed through the optical device.

9. The apparatus of claim 1, further wherein the beam splitter permits ambient light from behind the beam splitter to pass through to the optical device, such that the beam splitter is prevented from obstructing a line of sight of the optical device.

* * * * *